United States Patent [19]

Schulze

[11] 4,207,136
[45] Jun. 10, 1980

[54] WELDING MACHINE FOR THERMOPLASTIC WEB

[75] Inventor: Ehrhart Schulze, Fellbach, Fed. Rep. of Germany

[73] Assignee: Karl Heinz Stiegler, Stuttgart, Fed. Rep. of Germany

[21] Appl. No.: 968,203

[22] Filed: Dec. 11, 1978

[30] Foreign Application Priority Data

Dec. 15, 1977 [DE] Fed. Rep. of Germany ....... 2755860

[51] Int. Cl.$^2$ .................. B32B 31/00; B30B 15/34
[52] U.S. Cl. ............................. 156/515; 156/583.1
[58] Field of Search ............ 156/251, 515, 583, 290

[56] References Cited

U.S. PATENT DOCUMENTS

| | | | |
|---|---|---|---|
| 2,882,956 | 4/1959 | Weist | 156/353 |
| 3,663,338 | 5/1972 | Wech | 156/515 |
| 4,105,489 | 8/1978 | Lotto | 156/583 |

FOREIGN PATENT DOCUMENTS 1384570 2/1975 United Kingdom .
1526477 9/1978 United Kingdom .
1533127 11/1978 United Kingdom .

Primary Examiner—Douglas J. Drummond
Attorney, Agent, or Firm—Thomas R. Morrison

[57] ABSTRACT

A displacement device in a thermoplastic web welding apparatus withdraws the leading edge of the web from the welding apparatus during pauses in feeding and/or production to prevent melting and sticking of the leading edge.

10 Claims, 4 Drawing Figures

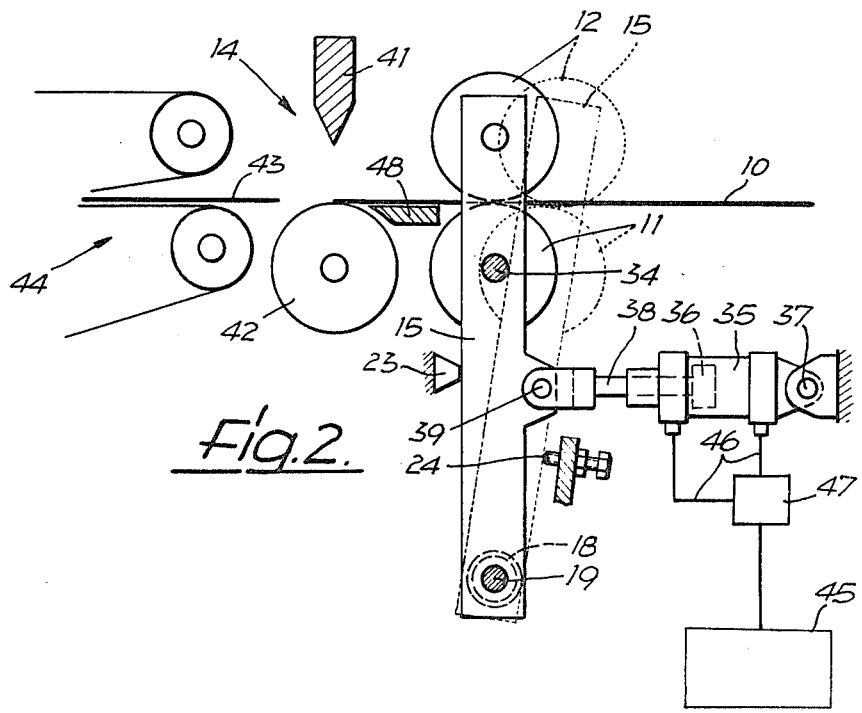

WELDING MACHINE FOR THERMOPLASTIC WEB

BACKGOUND OF THE INVENTION

The invention relates to a machine for producing welds in a thermoplastic web. Machines of this kind are generally used for producing bags from the separated ends of a tubular web of thermoplastic synthetic which is intermittently fed to the welding station, said ends of said tubular web being advanced past the welding station. A difference is hereby made between the so-called separation seam welding, in which the end marked off by the weld is at the same time separated from the web by said weld, and bottom welding, in which, simultaneously with the production of the weld, a cut is made which lies next to the weld. The web ends thus separated during welding then form the bags which are stacked after they emerge from the welding station and are then carried away, either manually or by machine.

In separation seam welding, a welding bar, movable upward and downward, acts in conjunction with a counter roll which forms a base for the web in the welding station. After each welding operation, after the front end of the web is separated, the leading edge of the web remaining in the welding station remains in contact with the counter roll until it is advanced during the succeeding feeding step. The leading edge of the web is warmed and softened during the welding. During stoppage, the softened leading edge may stick to the counter roll, thereby causing interruption of production until the adhesion is corrected.

In bottom welding, the weld is usually produced by an upper and lower welding jaw. Here, during the short interruption of the intermittent feed or during an interruption of the welding process for a longer pause, the leading edge of the web can become softened by proximity to the heated lower welding jaw and stick onto it. This interrupts production until cleared.

Through DT-AS 1942410, U.S. patent application filed Sep. 16, 1968, Ser. No. 760,048, a machine for separation seam welding is known in which, during the stoppage of the intermittently operating feed mechanism, the welding bar is adjustable in such a way that even when its upward and downward movement continues, it attains a position in which it can no longer touch the web. The web, now resting due to the standstill of the feed mechanism, is to be thus prevented from coming into contact with the still-operating welding bar, so that the welding bar is temporarily rendered inoperative without the whole machine having to be turned off.

However, when the interruption of the intermittent feed extends over several work cycles of the machine, the leading edge of the web is capable of adhering to the base, as described above, when operation of the feed mechanism is resumed. This is especially disadvantageous in the welding station which includes a lower welding jaw, for example, in a bottom weld machine.

It is an object of the invention to provide a machine for producing welds on a thermoplastic web, in which adhesion of the last welded leading edge of the web in the welding station during an interruption of the intermittent feed can be certainly avoided.

SUMMARY OF THE INVENTION

These and other objects are achieved in the apparatus in accordance with the invention. According to the present invention, the feed mechanism is mounted displaceable against the feeding direction from a first position into a second position. During normal pauses in intermittent feeding and/or longer interruption of the feed, the feed mechanism is shifted against its feeding direction into its second position which pulls the just welded leading edge of the web out of the welding station. This displacement of the feed mechanism can be done manually such as by a hand-operated lever which may also be coupled to the means for switching off the intermittently operating feed mechanism.

An automatic displacement drive can also be provided for shifting the feed mechanism.

In a preferred embodiment, the displacement drive is regulated by a control mechanism such that the feed mechanism is shifted into its second position immediately after the end of each welding and separation operation. The displacement drive shifts the feed mechanism into its second position at the end of each welding operation and shifts it back into its first position before the next welding operation begins. Thus, during each stoppage of the web in the regularly repeated interruptions of the intermittent feed, the leading edge of the web is pulled out of the area of the welding station after the welding operation and adhesion of the softened leading edge is thus avoided.

The control mechanism may optionally be arranged to pull the leading edge of the web back from the welding station only or also during longer interruptions of the web feed. The welding operaion can thus be interrupted for as long as desired without the remainder of the operation of the machine having to be interrupted and having to render the welding apparatus inoperative. By permitting the welding apparatus to continue during the interruption, for example, the welding bar touches the counter roll in each work cycle. The counter roll is always kept at the same normal operating temperature as during welding. This permits resumption of welding without the faulty welds normally resulting while waiting for the counter roll to heat up to operating temperature. Known counter rolls consist of heat-resistant material, such as a silicone rubber layer coated with teflon-reinforced glass fiber, and are not damaged by regular contact with the welding bar.

BRIEF DESCRIPTION OF THE DRAWINGS

The invention is described in detail in the following specification of two embodiments shown schematically greatly simplified in the drawings.

FIG. 1 is a perspective view of the welding station and of the feed mechanism of a first embodiment of the invention partly cut away.

FIG. 2 is a side view of the embodiment according to FIG. 1.

DETAILED DESCRIPTION OF THE INVENTION

Figure 3:
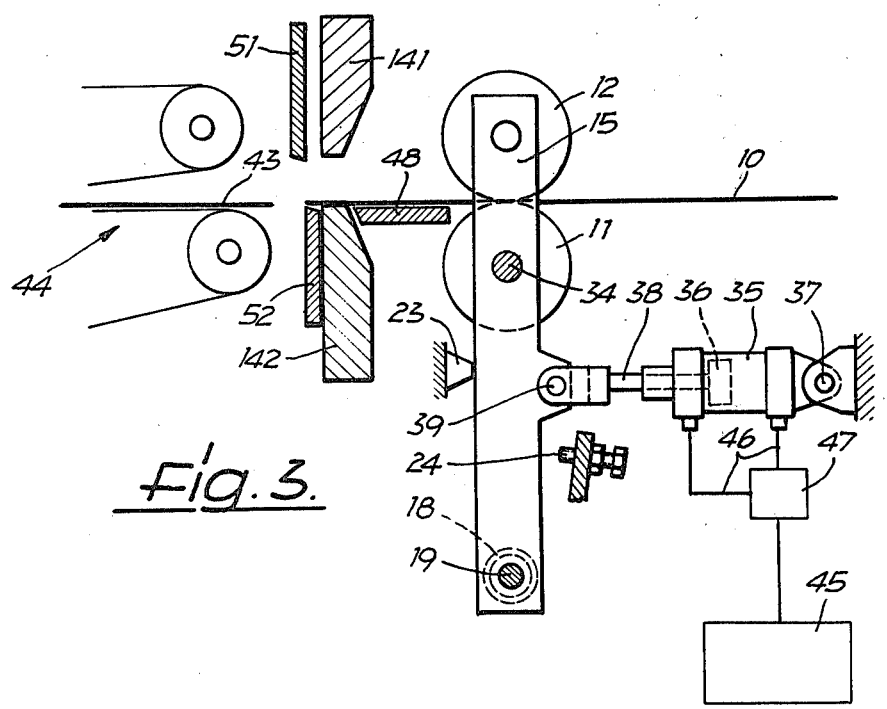
FIGS. 3 and 4 are side views corresponding to FIG. 2, of a second and a third embodiment, respectively, of the invention.

The embodiment, represented in FIGS. 1 and 2, of a machine for producing welds on a thermoplastic web 10, has an intermittently operating feed mechanism comprising two feed rolls 11 and 12 which rotate in the directions of the arrow, as shown, and thus advance the web 10 in the feeding direction 13, indicated by an arrow, and guide it into the welding station shown generally at 14. The web is guided into the gap between the feed rolls 11 and 12.

Feed rolls 11 and 12 are rotatably mounted with their ends in two levers 15 and 16, and are rotatably connected to each other through gears 17. Thus, when the lower feed roll 11 is rotated in the rotating direction, the upper feed roll 12 rotates simultaneously in the opposite direction. Levers 15 and 16 are rigidly joined to each other at their lower ends by a tube 18. A shaft 19, rotatably mounted in side walls 21 and 22 of the machine frame, runs through the tube 18. The levers 15 and 16 thus are permitted to swivel on the shaft 19 as a swivel axle, between the first position shown in FIGS. 1 and 2 in continuous lines, and into the second position shown in FIG. 2 in dotted lines. The first and second positions of the levers 15 and 16 are defined by abutment with stops 23 and 24, respectively, (FIG 2). Stop 24 consists of an adjustable screw which can be fastened with a lock nut to adjust the second position of the levers 15 and 16.

A sprocket pulley 25 is fastened to the shaft 19 inside the side wall 21, and another sprocket pulley 26 is fastened to the shaft 19 outside the side wall 21. The sprocket pulley 25 is connected by a sprocket belt 27 to a shaft 31, said shaft 31 being driven alternatively in opposite rotating directions, in the known way, through a brake-clutch combination 28, 29. The sprocket pulley 25 is therefore similarly intermittently rotated through appropriate regulation of the brake 28 and the clutch 29. The sprocket pulley 26 is connected by a sprocket belt 32 to a sprocket pulley 33 which is mounted on a shaft 34 on which also the lower feed roll 11 is mounted. A pneumatic stroke cylinder 35 with a piston 36 is provided as a displacement drive for swivelling both levers 15 and 16 and thus for adjusting the feed mechansim comprising the feed rolls 11 and 12 from the first into the second position, and back. A second stroke cylinder (not shown) may be disposed outside the side wall 22. The stroke cylinder 35 is mounted on the side wall 21, swivelling on an axle 37. Its piston rod 38 is swiveably connected to the lever 15 through a joint 39.

The welding station 14 has a welding bar 41 extending horizontally and transverse to the feeding direction 13. The welding bar, during stoppage of the web, is movable by a drive, not shown, from the raised resting position shown into a welding position pressing against a counter roll 42. When touching the web 10 introduced into the welding station 14, the welding bar 41 separates the end 43 of the web 10 projecting over the said welding bar 41 and said end of the web is carried away by a conveyor mechanism 44.

The upward and downward movement of the welding bar 41 is produced in the known way such as by continuously rotating cam discs or a crank mechanism or intermittently operating electrical or fluid actuating means. The intermittent drive for the feed rolls 11 and 12, adapted to this upward and downward movement of the welding bar, is caused by a corresponding regulation of the brake 28 and the clutch 29, as indicated above. For this a control device 45 of any type known in the art is actuated by rotating cams or other means. The rotating cams may be rotated by the common drive of the machine, which also drives the welding bar upward and downward. This kind of control is generally known so that a detailed description is superfluous.

The supply and discharge of compressed air on both sides of the double acting piston 36 of the stroke cylinder 35 takes place through pipes 46. The pipes 46 are connected through a valve 47 to an opening, not shown, for supply or exhausting compressed air. The valve is also controlled by the control device 45. The welding operation may be stopped while the welding device continues to run without melting the leading edge of the web. This is accomplished in the embodiment represented in FIGS. 1 and 2 by the control device 45 actuating the stroke cylinder as a welding operation is completed and the welding bar 41 starts to raise from the web 10. The feed rolls 11 and 12 are stopped at this time and the stroke cylinder 35 moves the feed rolls 11, 12 from the first position into a second position, shown in FIG. 2. In the second position, the leading edge of the web 10 is withdrawn from the welding station 14 and lies on a base 48 which is not heated during welding. The welding bar 41, continuing to move up and down, now directly touches the counter roll 42 without touching the leading edge of the web 10. The continued periodic contact between the welding bar and the counter roll at the normal cyclic rate maintains the counter roll near its usual production temperature. Welding can therefore be resumed at will without waiting for the counter roll to heat up.

When welding is to be resumed, the drive of the feed rolls 11 and 12 is switched on and stroke cylinder 35 is actuated at the proper time by control device 45 so that the normal welding operation can begin again.

In the embodiment represented in FIG. 3, all the parts which essentially correspond to the embodiment in accordance with FIGS. 1 and 2, have the same reference numbers so that through this indication, the preceding description can be referred to.

The embodiment in accordance with FIG. 3 differs from the preceding embodiment principally in that this embodiment involves bottom weld machines in which the weld is produced by an upper welding jaw 141 and a lower welding jaw 142, without at the same time cutting the web at the weld. A cutting apparatus is provided for separating the one end 43 of the web 10 which forms a bag. The cutting apparatus has upper and lower blades 51 and 52, respectively. The upper blade 51 is moved up and down together with the upper welding jaw 141. In other respects, the set up and the function of the machine shown in FIG. 3 is the same as in the machine shown in FIGS. 1 and 2.

Figure 4:
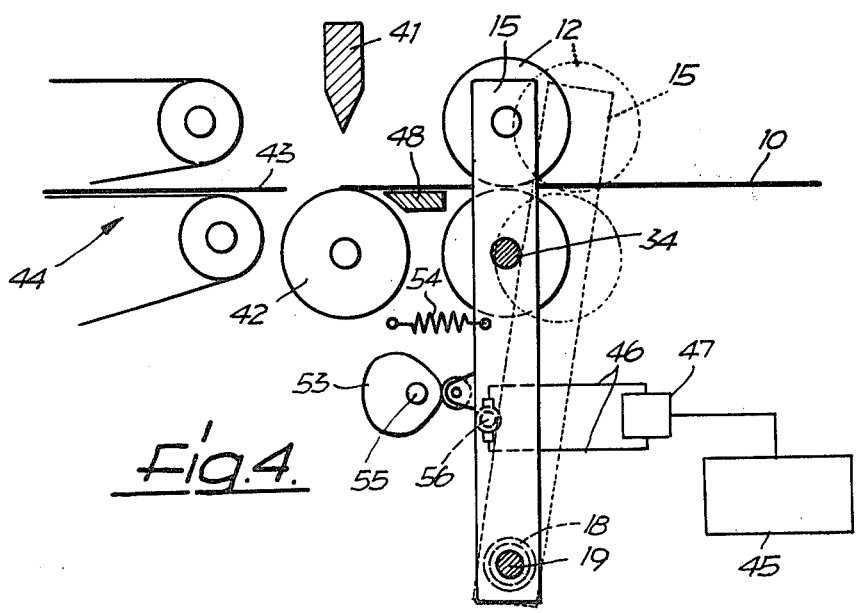

The embodiment shown in FIG. 4 differs from the preceding embodiment in that here, instead of using a stroke cylinder 35 for displacement of the feed mechanism 11, 12, a cam disc 53 is provided which engages one or both levers 15 or 16. This cam disc 53 moves the feed mechanism 11, 12 against the strength of a spring 54 at regular intervals from the first position into the second position and then controls its return movement through the strength of the spring 54. The shaft 55 carrying the cam disc 53 is rotated synchronously with the drive shaft for the welding mechanism, so that through appropriate shaping of the cam disc 53, the control realized by the said cam disc at the same time forms the displacement drive which shifts the feed mechanism 11, 12 into its second position immediately after the end of a welding and separating operation and causes the spring 54 to shift the feed mechanism 11, 12 back to its first position promptly before the next welding operation. In this embodiment, therefore, the control of the displacement drive is released by each welding operation.

A bolt 56 interferes with the return of the feed mechanism 11, 12 during a longer interruption of the welding process while the welding mechanism continues to run. This pulls back the leading edge of the web from the welding station and keeps it in this position for the duration of the stoppage of the welding operation. The bolt 56 may be automatically moved by the control mechanism 45 into the path of the lever 15 when the lever is in the second position and the intermittent drive of the feed rolls 11, 12 has been stopped. When the welding process is resumed, the bolt 56 is moved by the control mechanism 45 out of the path of the lever 15 so that the above-described continuous operation can take place again. Manual operation of the bolt 56 may also be employed.

For simplification of the description, only one cam disc 53 and one stroke cylinder 35 for interaction with the lever 15 are mentioned above. It is within the contemplation of the present invention that each of levers 15 and 16 be provided with one cam disc 53, stroke cylinder 35 or bolt 56 each.

In the foregoing, the invention was described on the basis of embodiments in which feed rolls 11 and 12 are provided for the intermittent feed of the web 10. Instead of the feed rolls 11 and 12, any other kind of feed mechanism suitable for an intermittent feed of a web can be provided.

In the embodiments in accordance with FIGS. 1, 2 and 4, in order to prevent the counter roll 42 from being unequally warmed by the contact with the welding bar 41 and at the same time to hasten the separation of the end 43 from the web 10 in separation seam welding, in both the cases mentioned, the counter roll 42 is driven at a slightly greater peripheral speed than the feed rolls 11 and 12.

It will be understood that the claims are intended to cover all changes and modifications of the preferred embodiments of the invention, herein chosen for the purpose of illustration which do not constitute departures from the spirit and scope of the invention.

What is claimed is:

1. Machine for producing welds on a thermoplastic web comprising an intermittently operating feed mechanism for feeding said web in successive feeding steps; a welding station effective during standstill of said web between two feeding steps to weld said web and separate it from its end which is advanced beyond the welding station and means for displacing said feed mechanism and the web therein in the feeding direction between a first position and a second position.

2. Machine in accordance with claim 1, further comprising adjustable stop means for adjusting said second position.

3. Machine in accordance with claim 1 or 2, wherein said means for displacing includes displacement drive means for displacing the feed mechanism between said first and second positions.

4. Machine in accordance with claim 3, wherein said means for displacing is operative to displace said feed mechanism into said second position immediately after the end of a welding and separating operation.

5. Machine in accordance with claim 4, wherein said means for displacing is operative for displacing said feed mechanism into its second position at each welding step and for displacing said feed mechanism back into its first position before the start of the next welding step.

6. Machine in accordance with claim 5, wherein said displacement drive means is a rotating cam.

7. Machine in accordance with claim 6, further comprising control means for interrupting the welding operation while the welding station continues to run, for holding said feed mechanism displaced in its second position and for switching the feed mechanism off.

8. Machine for producing welds on a thermoplastic web comprising an intermittently operating feed mechanism for feeding said web in successive feeding steps; a welding station effective during standstill of said web between two feeding steps to weld said web and separate it from its end which is advanced beyond the welding station, means for displacing said feed mechanism and the web therein in the feeding direction between a first position and a second position, an axle and said feed mechanism being mounted swivelling on said axle for swivelling said feed mechanism between said first and second positions.

9. Machine in accordance with claim 8, further comprising feed roll means in said feed mechanism for feeding said web to said welding station, two levers, said feed roll means being mounted between said two levers, said two levers being swivelled on said axle, and a drive wheel for the feed rolls mounted coaxial to said axle.

10. A machine for producing transverse welds in a web comprising:
    a welding station including at least one heated welding bar;
    intermittent driving means for intermittently driving said web through said welding station;
    displacement means attached to said driving means for displacing said intermittent driving means and the web therein in a feeding direction of said web whereby a leading edge of said web is withdrawn from said welding station in the period between welding operations and sticking of said leading edge is prevented.

* * * * *